W. W. SIBSON & T. ALLSOP.
SINGEING MACHINE.
APPLICATION FILED SEPT. 2, 1909.

1,046,878.

Patented Dec. 10, 1912.

W. W. SIBSON & T. ALLSOP.
SINGEING MACHINE.
APPLICATION FILED SEPT. 2, 1909.

1,046,878.

Patented Dec. 10, 1912.

Witnesses:
Jas. E. Hutchinson
J. H. Reid

Inventors
Walter W. Sibson and Thomas Allsop
by their Attorney

W. W. SIBSON & T. ALLSOP.
SINGEING MACHINE.
APPLICATION FILED SEPT. 2, 1909.

1,046,878.

Patented Dec. 10, 1912.
6 SHEETS—SHEET 4.

Fig. 4.

W. W. SIBSON & T. ALLSOP.
SINGEING MACHINE.
APPLICATION FILED SEPT. 2, 1909.

1,046,878.

Patented Dec. 10, 1912.
6 SHEETS—SHEET 5.

W. W. SIBSON & T. ALLSOP.
SINGEING MACHINE.
APPLICATION FILED SEPT. 2, 1909.

1,046,878.

Patented Dec. 10, 1912.

UNITED STATES PATENT OFFICE.

WALTER W. SIBSON AND THOMAS ALLSOP, OF PHILADELPHIA, PENNSYLVANIA, ASSIGNORS TO THE PHILADELPHIA DRYING MACHINERY COMPANY, OF PHILADELPHIA, PENNSYLVANIA, A CORPORATION OF PENNSYLVANIA.

SINGEING-MACHINE.

1,046,878.  Specification of Letters Patent.  Patented Dec. 10, 1912.

Application filed September 2, 1909. Serial No. 515,784.

*To all whom it may concern:*

Be it known that we, WALTER W. SIBSON and THOMAS ALLSOP, citizens of the United States, residing at Philadelphia, in the county of Philadelphia and State of Pennsylvania, have invented certain new and useful Improvements in Singeing-Machines; and we do hereby declare the following to be a full, clear, and exact description of the invention, such as will enable others skilled in the art to which it appertains to make and use the same.

This invention relates to improvements in singeing machines employed for the treatment of hosiery, and is more particularly related to singeing machines of the type covered by our pending application for Letters Patent of the United States, Serial No. 485,967.

In the machines of the type above referred to the stockings are supported by a plurality of rotatable forms which carry the stockings through the singeing flames, and when the forms are made of metal they absorb a percentage of the heat of the singeing flames so that in their successive passages through the flames the metallic forms become heated to such an extent as to cause, under certain conditions, excessive heating of the stockings and resultant injury to the latter. This arises especially when the stockings are finished by the oxidized process, the stockings being singed in the "green". At that stage of the process, the stockings contain a certain amount of chemicals and an excessive amount of heat causes them to become tender, resulting in considerable loss to the manufacturer.

The present invention, therefore, aims to overcome the excessive heating of the stockings during the singeing operation by the provision of means whereby the supporting forms are cooled, to which end the forms are subjected individually to the cooling action of a suitable medium applied thereto and serving to maintain the forms at such temperature as to preclude possible injury to the stockings when placed thereon or while supported thereby.

A further object of the present invention is to improve the construction of the means by which each of the stocking forms or supports is given independent rotation upon the table that carries the same, whereby all shock is eliminated and coöperation of the parts effected without jar to the machine.

The present invention further aims to provide simple and efficient means for smoothing the stockings and freeing the same of wrinkles after they have been placed upon the forms and before presentation to the singeing medium, thus enabling the stockings to enter the singeing zone in a smooth condition and insuring uniformity of singeing throughout the entire area of the stockings.

Furthermore, the present invention seeks to improve the construction of the singeing burners and their mountings, whereby to facilitate their movement both in adjustment and in relation to the movement of the stocking forms as the latter pass through the singeing zone.

Having these general objects in view, and others that will appear as the nature of the improvements is better understood, the invention consists substantially in the novel construction, combination and arrangement of parts hereinafter fully described, illustrated in the accompanying drawings, and pointed out in the appended claims.

While the invention herein shown and described is believed, at this time, to be embodied in a preferable form thereof, the invention is susceptible of various changes without departing from its spirit and intent, and the right is accordingly reserved to make such changes, modifications and variations as fall within the true scope of the invention.

Referring in detail to the accompanying drawings, the numeral 1 designates the base of the singeing machine; 2 the rotatable table thereof; 3 the standard upon which the table 2 is mounted for rotary movement; 4 the gear through the medium of which said table is actuated; 5 the eccentrically-mounted gear by which independent rotation is imparted to the forms carried by the table 2, and 6 the supporting forms. The numeral 7 designates the socket or hub for each of the forms 6, which latter are carried by vertically-arranged shafts 8, the lower ends of which pass through and are supported within the hubs 7.

Connected to the upper portion of the standard 3 is a substantially Y-shaped horizontally-disposed yoke 9, the free ends of the divided portion of which receive the upper ends of a pair of vertically-arranged stay rods 10, the yoke 9 and the stay rods 10 forming a support for the stripping mechanism, which, for purposes of clearness, is omitted from the illustration.

The numeral 11 designates the driving shaft of the machine, and from this shaft the table 2 is operated through the gearing as fully illustrated in our co-pending application, and described therein.

All of the elements described to this point are those embodied in the machine set forth in our previous application referred to, and therefore require no further description herein.

It has been premised that one of the objects of the present invention is the provision of suitable means for cooling the stocking supporting forms, and thus preventing excessive heating of the same during the singeing operation. When the forms 6 are made of metal they are in the form of a tapering shell and are, therefore, hollow, and, as stated, in their passage through the singeing flames they absorb a percentage of the heat thereof. To effect cooling of the forms 6 each of the latter has arranged therein a spray pipe 12, said pipes extending lengthwise of said forms, and each of these pipes is provided with a plurality of openings 13 so that the cooling medium, preferably water, may issue from the spray pipes in a plurality of jets, these jets being projected against the inner face of the forms 6 substantially throughout their length, and thereby serving to reduce the temperature of the forms. At a point adjacent to the upper end of each of the forms 6 the same is provided with a spider 14, the latter being perforated, and the upper end of the spray pipe 12 is open so that the cooling medium may issue therefrom and be projected through the spider 14 in order to be brought into contact with the extremity of the upper portion of the form. Hence, the upper end of the form, upon which the foot of the stocking is placed when the stocking is upon the form, is constantly subjected to the issuing jet of water discharged by the upper end of the spray pipe 12.

Figure 1:
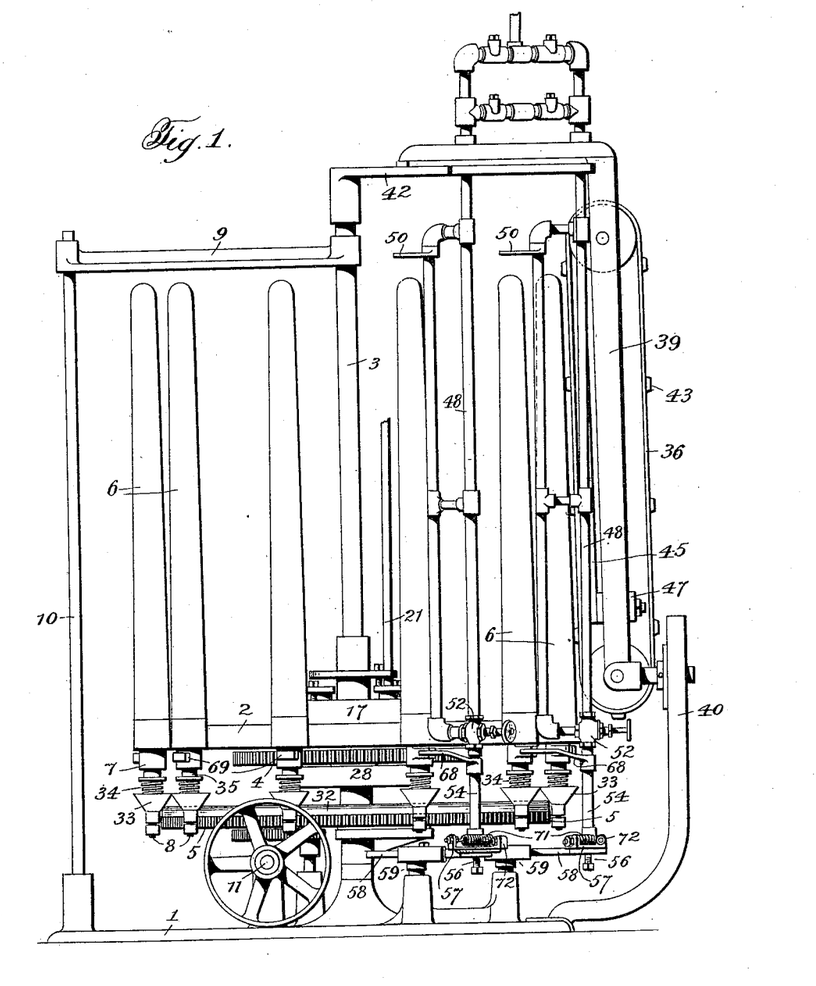
—Figure 1 is a side elevation of a singeing machine embodying the herein described improvements.
Figure 2:
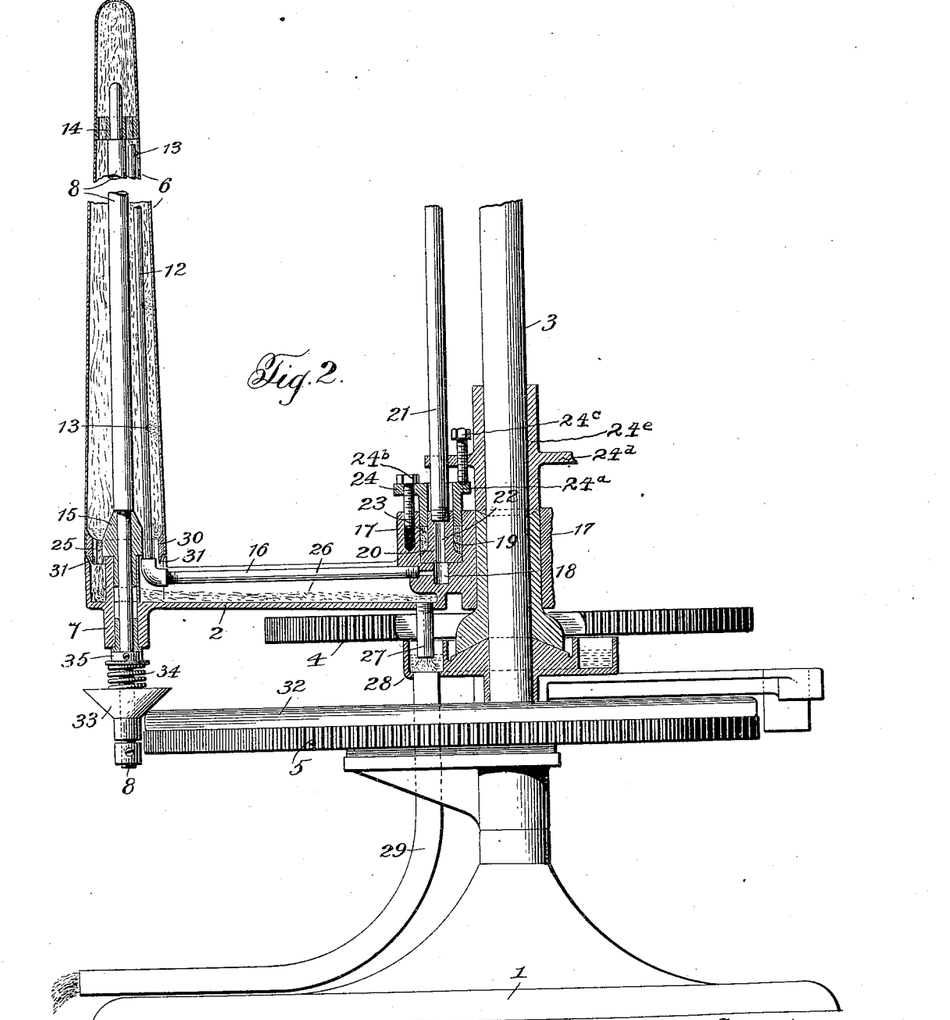
Fig. 2 is a fragmentary transverse sectional view thereof.
Figures 3, 9:
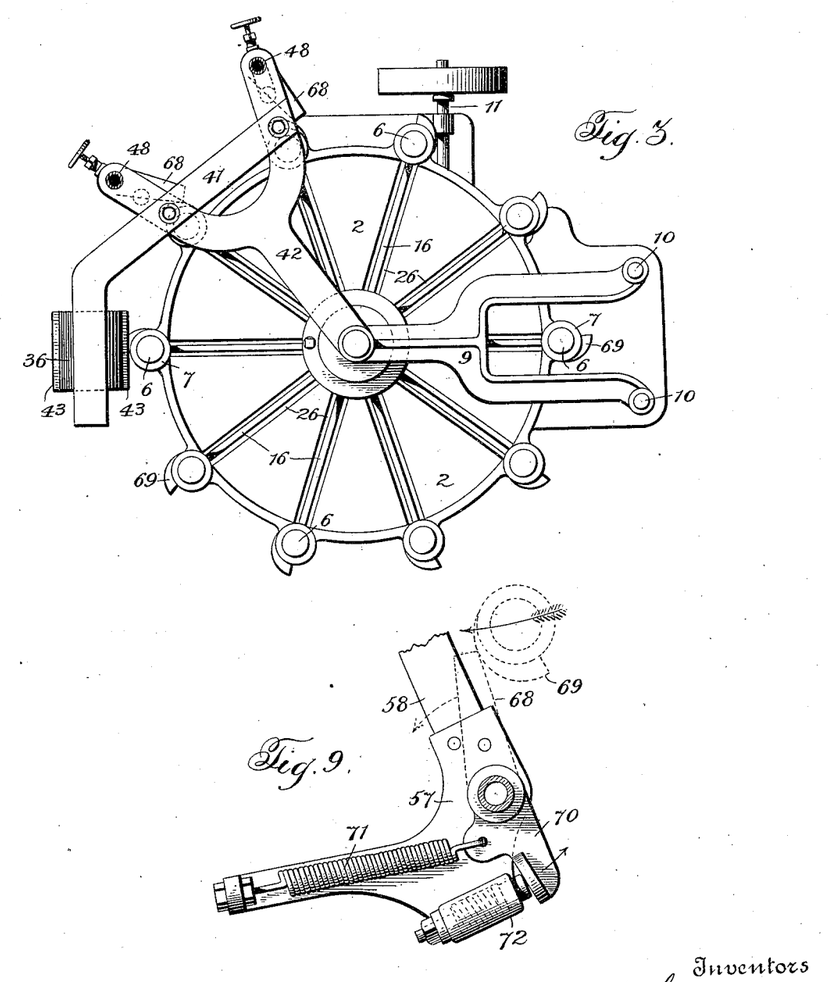
Fig. 3 is a top plan view of the machine.
Figure 4:
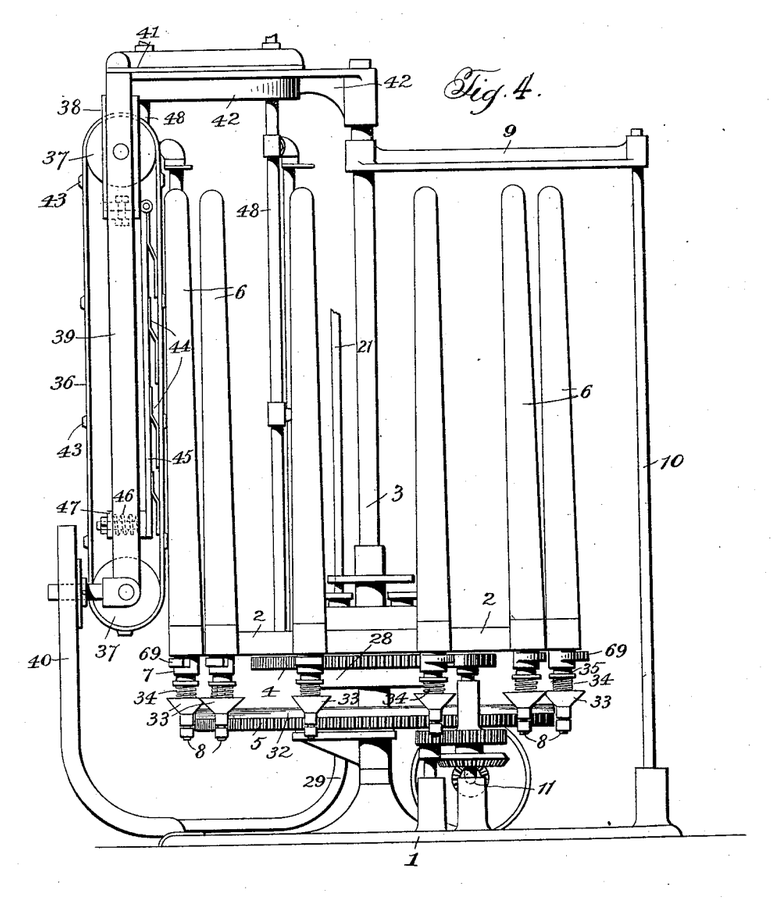
Fig. 4 is a view similar to Fig. 1, viewing the machine from the opposite side thereof.
Figure 5:
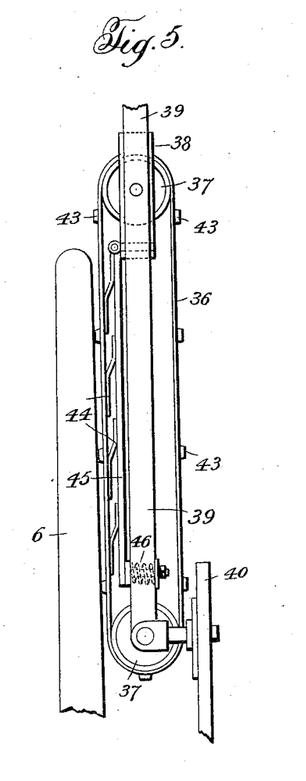
Fig. 5 is a detail elevation, on an enlarged scale, of the means employed for freeing the stockings of wrinkles before they are introduced into the singeing zone.

The spray pipe 12 is associated with a conical bearing 15 arranged within the lower end of the form 6, said bearing being carried by the hub 7, so that the spray pipes of the respective forms remain stationary therein, and occupy a fixed position in relation to the hubs. To the lower end of each of the spray pipes 12 is connected a feed pipe 16 which extends to the hub 17 of the table 2, and said feed pipes are connected to a water pocket 18 that is formed in said hub. This water pocket is constituted by a groove arranged concentrically of the hub 17. Immediately above the pocket 18, and of greater width than the latter, is a packing chamber 19 which receives a stationary flanged ring 20, the flanged portion of the latter being seated upon the bottom of said chamber. Connected to the ring 20 is a water supply pipe 21 which communicates, through the medium of a port 22, with the stationary water pocket 18. Suitable packing 23 is arranged at the sides of the ring 20, and upon the flanges thereof, and said packing is held within the chamber 19 by an outer gland 24 and an inner gland 24ᵃ. The gland 24 is held upon the hub 17, so as to rotate with said hub, by a plurality of screws 24ᵇ, one only being shown in Fig. 2, these screws being properly distributed at spaced intervals around the gland 24. The gland 24ᵃ is held in position in the pocket 19 by a plurality of set screws 24ᶜ, distributed at spaced intervals around said gland. Only one of these screws 24ᶜ is shown in Fig. 2. By reason of the screws 24ᶜ, which are arranged in an annular flange 24ᵈ, the latter being a part of a sleeve 24ᵉ, carried by the stationary standard 3, the pipe 21 passing through said flange 24ᵈ, it will be observed that the gland 24ᵃ is held stationary, and therefore does not rotate as does the gland 24, this latter being connected to the hub 17 by the screws 24ᵇ, as previously indicated. Thus it will be seen that a water tight joint is provided for the ring 20.

To remove the water from the forms 6 the conical bearings 15 of the latter are provided with discharge openings 25, which openings deposit the water in channels 26 one of which leads from each of the hubs 7 inwardly to the hub 17 of the table 2, a drain pipe 27 being provided at the inner end of said channels to empty the latter of the water discharged therein from the forms 6. This drain pipe 27 discharges into a collecting pan 28 which surrounds the standard 3 immediately below the gear wheel 4, the pan 28 being drained of the water accumulating therein by a discharge pipe 29.

From the foregoing it will be observed that in the operation of the machine the cooling medium is fed to the pocket 18 by the pipe 21. As the pocket 18 extends around the entire hub 17, and as each of the forms 6 is connected thereto, it will also be understood that the water pocket 15 provides a common source of supply for all of the forms. Therefore, as the water enters the pocket 15 and fills the same, it is led off by the respective feed pipes 16 to the forms with which they are connected. The water is thus discharged by the spray pipe 12 of each of the forms against the inner side of the latter, reducing the temperature of the forms, and, gravitating to the bottom or lower end of the forms, is discharged by the openings 25 into the outer ends of the channels 26, whence the water passes by the drain pipe 27 into the collecting pan 28, and is taken from the latter by the discharge pipe 29. During the spraying of the water by the pipes 12 the forms 6 are rotated, and this rotation subjects all portions of the forms to the cooling action of the water. This maintains the forms at low temperature, and precludes possibility of injury to the stockings on the forms because of excessive heating of the stockings. To confine the water within the lower ends of the forms 6 each of the latter is provided at its lower end with a closure ring 30 having a depending flange 31, said ring lying in close proximity to the periphery of the conical bearing 15, and said flange 31 projects into the hub 7, as clearly illustrated in Fig. 2.

In the form of the machine covered by our previous application No. 485,967 the stocking supporting forms are given independent rotation upon the table through the medium of pinions carried at the lower ends of the shafts that support the forms, said pinions engaging the eccentrically-mounted gear. It has been found that this construction causes a slight shock when the pinions are brought into engagement with the teeth of the gear. The present invention, as indicated, seeks to improve the construction of the machine in this particular by eliminating all shock incident to the action of the driving element upon the several stocking supporting forms. To this end, it is proposed to dispense with the pinions and to substitute therefor a friction drive, and in the accomplishment of this the gear wheel 5 is provided at its upper face with a friction disk 32 suitably secured thereto for movement therewith, the edge of said disk 32 being adapted to engage a plurality of friction cones 33, one of which is mounted upon the lower end of each of the shafts 8. These cones 33 are splined upon the shafts 8, and are normally urged in a downward direction by coil springs 34 which surround the shafts 8 and are interposed between the cones 33 and suitable collars 35 arranged below the hubs 7. By reason of the springs 34 the friction cones 33 are capable of yielding movement upon the shafts 8, but rotate with the shafts; consequently, as each of the cones 33 rides upon the edge of the friction disk 32, as the singeing zone is approached, an easy contact of the cone with said disk is made without any shock or jar, and immediately upon this contact being effected the frictional engagement of the disk and cone imparts rotation to the form 6 with which the cone is associated, this rotation continuing until the form passes out of the singeing zone, whereupon the friction cone rides off of the disk 32 and rotation of the form 6 ceases. It has also been indicated that the present invention aims to provide simple and efficient means for smoothing the stockings and freeing the same of wrinkles after they have been placed upon the forms and before they have been presented to the singeing means. To accomplish this purpose an apron conveyer 36 is employed, this conveyer being mounted upon a pair of rolls 37 arranged in vertical alinement with each other. The upper roll 37 is journaled in a substantially rectangular frame 38 from which depend a pair of arms 39 and the lower roll 37 is journaled in the lower portions of said arms 39, the latter being suitably connected to a bracket 40 which is fixedly connected to the base 1 of the machine. The frame 38 is also connected to a supporting arm 41, which latter is carried by the substantially Y-shaped supplemental yoke 42 employed in the machine of our former application, and to which yoke the upper ends of the singeing burners are connected. The conveyer 36 is provided with transversely-extending cleats 43 the function of which is to engage the stocking and draw the latter downwardly upon the form, thereby smoothing the stockings upon the forms and freeing the stockings of the wrinkles therein, the reach of the conveyer 36 that is immediately next to the forms 6 moving in a downward direction. That there may be proper pressure exerted by the conveyer 36 upon the stockings, a series of springs 44 is arranged upon a presser bar 45, which bar is hingedly connected at its upper end to the frame 38, while its lower end is urged in an outward direction, or toward the forms 6, by a coil spring 46 interposed between said bar 45 and a supporting bar 47 carried by the arms 39. Thus it will be seen that the springs 44 form a yielding support for the reach of the conveyer 36 that is immediately contiguous to the forms 6, and that the presser bar 45 is also yieldingly supported by the spring 46, the springs 44 relieving the pressure and at the same time rendering the action of the conveyer positive.

Figure 6:
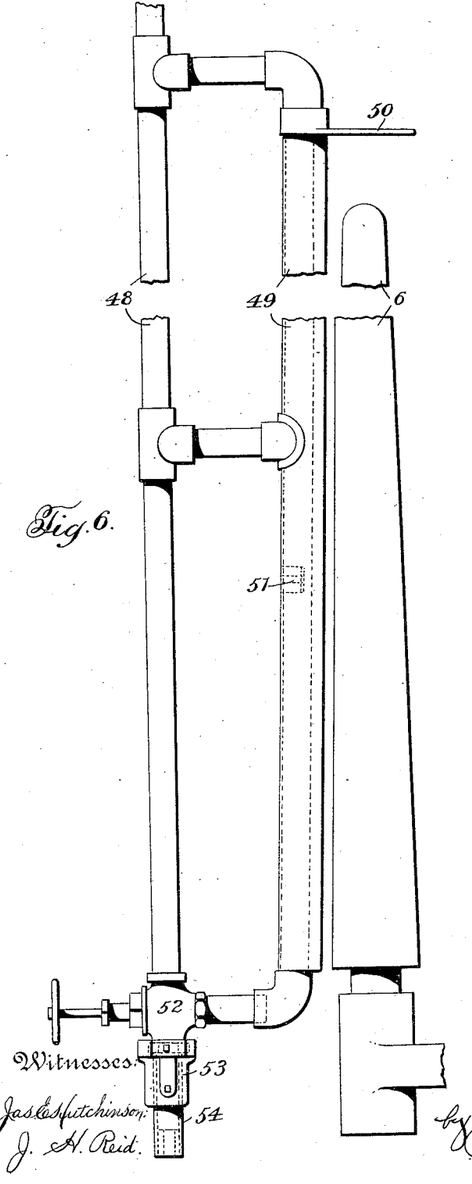
Fig. 6 is a similar view of one of the singeing burners.
Figure 7:
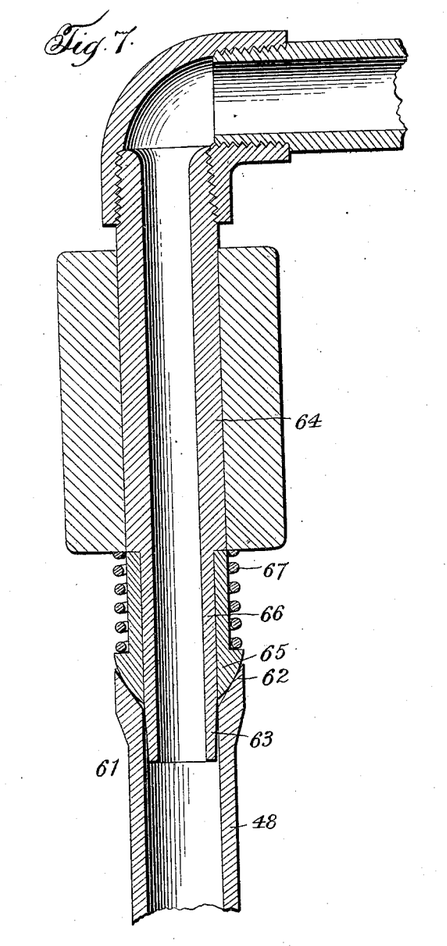
Fig. 7 is a transverse sectional view of the mounting for the upper end of the burner illustrated in Fig. 6; and, Fig. 8 is a similar view of the mounting for the lower end of said burner.
Figure 8:
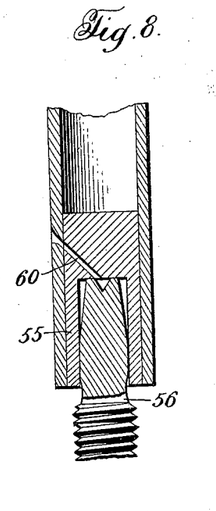

In Figs. 6, 7 and 8 is disclosed the construction of the singeing burners and their mountings, and by referring to these figures it will be observed that the burners include a supporting tube 48 and a burner tube 49, the latter being provided with a longitudinally extending shield 50, as in the form of burner illustrated and described in our previous application. The burner tube 49 is also divided by a plug 51 into upper and lower compartments, whereby to vary the singeing area of the burner, and for controlling the flow of the gas to the burner a valve 52 is employed. In the present form of the burner, the controlling valve 52 is arranged at the lower end of the supporting tube 48, thereby eliminating the necessity of fitting the valve at an intermediate point in said tube, and the lower end of said valve is received by a joint-lock 53, which is in the form of a socket, carried at the upper end of a spindle 54. This spindle forms the support for the lower end of the burner, and provides for the swinging movement of the latter in relation to the forms 6, and the lower end of said spindle is provided with a plug 55 which receives the upper end of a set screw 56. The set screw 56 is mounted in a supporting foot 57 carried by the laterally adjustable arm 58 of the vertically-adjustable holder 59, illustrated and described in our previous application. The upper end of the set screw 56 is tapered, as clearly illustrated in Fig. 8, thereby providing for free play of the burner in its swinging movement upon the set screw 56. The plug 55 has an oil duct 60 leading from the exterior of the spindle 54, and through this duct a suitable lubricant is introduced to the engaging surfaces of the set screw and spindle.

At the upper end of the supporting tube 48 is a coupling 61 having a flared mouth 62, and this coupling receives the reduced end 63 of the pipe 64 that leads from the supply of the gaseous mixture. Surrounding the reduced end 63 of the pipe 64 is a conical bushing 65, the stem 66 of which is slidably mounted upon the reduced end 63 of the pipe 64, and encircling said stem is a coil spring 67. This spring bears against the head of the bushing 65 and the support for the pipe 64, and as the coupling 61 moves upon the reduced end 63 of the pipe 64, it is obvious that the conical bushing 65 will follow the coupling 61 under the influence of the spring 67. It will be observed that the extremity of the reduced end 63 is slightly tapered, while the face of the conical bushing 65 is somewhat rounded, the flared mouth 62 of the bushing 61, upon which the conical bushing bears, being straight. This permits the coupling 61 to have free movement upon the conical bushing in the adjustment of the burner.

Connected to the spindle 54 is a contact arm 68, the free end of said arm being adapted to engage cam lugs 69. One of these lugs is carried by each of the hubs 7, and when the arm 68 engages the cam lugs in the rotation of the table 2, the burner is swung upon its support and follows the contiguous form 6, in the manner described in our previous application. An attaching arm 70 is also carried by the spindle 54, to which arm a coil spring 71 is connected, said spring being also connected to the supporting foot 57, and said spring exerts its tension to return the burner to its normal position when the contact arm 68 rides off the cam lugs 69. An adjustable buffer 72 is also carried by the supporting foot 57, against which the attaching arm 71 is drawn into contact under stress of the spring 70, this buffer being provided to take up the shock incident to the return of the burner to its normal position. At the same time, the adjustment of the buffer 72 will regulate the throw of the burner, in its swinging movement, and thereby vary the normal position of the burner in accordance with the point at which it is desired the spring 70 shall bring the burner to rest.

Having thus described the invention, what is claimed as new, and desired to be secured by Letters Patent, is:

1. In a singeing machine, a form for supporting the articles to be singed, and means associated with said form for spraying the latter with a suitable cooling agent.

2. In a singeing machine, a form for supporting the articles to be singed, and a spraying device arranged within said form for subjecting the latter to the action of a suitable cooling agent.

3. In a singeing machine, a form for supporting the articles to be singed, means for subjecting the form to the action of a suitable cooling agent, and means for collecting and discharging said cooling agent.

4. In a singeing machine, a form for supporting the articles to be singed, means within the form for spraying the interior thereof with a suitable cooling agent, and means for discharging the cooling agent from the form.

5. In a singeing machine, a table, a form associated with said table for supporting the articles to be singed, means for subjecting said form to the action of a suitable cooling agent, means connected to said table for supplying the latter with said cooling agent, and means for collecting and discharging the cooling agent after its action upon the form.

6. In a singeing machine, a table, a form associated with said table for supporting the articles to be singed, a spraying device associated with said form for subjecting the latter to the action of a suitable cooling agent, means connected to said table for supplying the latter with said cooling agent, and means for feeding the latter to said spraying device.

7. In a singeing machine, a table, a form associated with said table for supporting the articles to be singed, a spraying device associated with said form for subjecting the latter to the action of a suitable cooling agent, means connected to said table for supplying the latter with said cooling agent, means for feeding the cooling agent to said spraying device, and means for collecting and discharging the cooling agent after its action upon the form.

8. In a singeing machine, a table, a form associated with said table for supporting the articles to be singed, a spraying device arranged within said form for subjecting the latter to the action of a suitable cooling agent, means connected to said table for supplying the latter with said cooling agent, a feed pipe extending from said supply to said spraying device, and means for collecting and discharging the cooling agent after its action upon the form.

9. In a singeing machine, a table provided with a pocket for receiving a suitable cooling agent, a form associated with said table for supporting the articles to be singed, a spraying device associated with said form for subjecting the latter to the action of the cooling agent, and a pipe connecting said spraying device and said pocket for feeding the cooling agent from the pocket to the spraying device.

10. In a singeing machine, a table provided with a pocket for receiving a suitable cooling agent, a form associated with said table for supporting the articles to be singed, a spraying device associated with said form for subjecting the latter to the action of the cooling agent, a pipe connecting said spraying device and said pocket for feeding the cooling agent from the pocket to the spraying device, and means associated with said table for collecting and discharging the cooling agent after its action upon the form.

11. In a singeing machine, a table provided with a pocket for receiving a suitable cooling agent, a form associated with said table for supporting the articles to be singed, a spraying device associated with said form for subjecting the latter to the action of the cooling agent, a pipe connecting said spraying device and said pocket for feeding the cooling agent from the pocket to the spraying device, said table having a channel into which the cooling medium is discharged after its action upon the form, and means for discharging the collected cooling agent from said channel.

12. In a singeing machine, a table provided with a pocket for receiving a suitable cooling agent, a plurality of forms associated with said table for supporting the articles to be singed, a spraying device associated with each of said forms for subjecting the latter to the action of the cooling agent, a pipe connecting each of said spraying devices with said pocket for feeding the cooling agent from the pocket to the spraying devices, said table having a plurality of channels into which the cooling agent is discharged after its action upon the forms, a collecting pan for receiving the cooling agent from said channels, and means for discharging the cooling agent from said pan.

13. In a singeing machine, a table, a support for the articles to be singed mounted for independent rotation on said table, a driving element, and a yielding frictional connection between said driving element and said support.

14. In a singeing machine, a table, a support for the articles to be singed mounted for independent rotation on said table, a driving element, and a frictional cone associated with said support and coöperating with said driving element to actuate said support.

15. In a singeing machine, a table, a support for the articles to be singed mounted for independent rotation on said table, a driving element, and a yieldingly mounted frictional cone associated with said support and coöperating with said driving element to actuate said support.

16. In a singeing machine, a table, a support for the articles to be singed mounted for independent rotation on said table, a driving element, and a frictional cone slidably mounted upon the axis of said support and coöperating with said driving element to actuate said support.

17. In a singeing machine, a table, a support for the articles to be singed mounted for independent rotation on said table, a driving element, and a frictional cone slidably and yieldingly mounted upon the axis of said support and coöperating with said driving element to actuate said support.

18. In a singeing machine, a table, a support for the articles to be singed mounted for independent rotation on said table, a driving element, a frictional cone mounted upon the axis of said support and coöperating with said driving element to actuate said support, and means for imparting a yielding contact between said cone and said driving element.

19. In a singeing machine, a table, a support for the articles to be singed mounted for independent rotation on said table, a driving element, a frictional cone mounted upon the axis of said support and coöperating with said driving element to actuate said support, and a spring associated with said frictional cone and acting upon the latter to establish a yielding contact between said cone and said driving element.

20. In a singeing machine, singeing means, means for supporting the articles to be singed, an apron conveyer coöperating with said supporting means for straightening the articles on the latter after the articles have been applied thereto, and a yielding pressure device associated with said conveyer to effect a yielding engagement of the conveyer with the supporting means.

21. In a singeing machine, means for supporting the articles to be singed, a burner associated therewith, a yielding mounting for one end of said burner, and an adjustable mounting for the other end of said burner.

22. In a machine of the class described, means for supporting the articles to be singed, a burner associated therewith, a yielding swivel connection for said burner, and an adjustable connection therefor acting in opposition to said yielding connection.

23. In a singeing machine, means for supporting the articles to be singed, a burner associated therewith, a support for said burner, a fuel supply therefor, and a resilient swivel connection between said fuel supply and the burner.

24. In a machine of the class described, means for supporting the articles to be singed, a burner associated therewith, a support for said burner, a fuel supply therefor, a yielding swivel connection between said fuel supply and the burner, and means for adjusting the burner in opposition to said yielding connection.

25. In a singeing machine, means for supporting the articles to be singed, a burner associated therewith, a coupling associated with said burner having a flared mouth, a fuel supply, a conical bushing associated with the said fuel supply and coöperating with the flared mouth of said coupling to provide a swivel connection between the burner and the fuel supply, and means for holding said bushing in yielding connection with said coupling.

26. In a singeing machine, means for supporting the articles to be singed, a burner associated therewith, said burner comprising a supporting tube and a burner tube, the latter being divided into compartments, whereby to vary the effective singeing area of the burner, and a valve associated with said supporting tube for controlling the compartments of said burner tube.

27. In a singeing machine, means for supporting the articles to be singed, a burner associated therewith, said burner comprising a supporting tube and a burner tube, the latter being divided into compartments, whereby to vary the effective singeing area of the burner, and a valve associated with said supporting tube and positioned therein at the point of connection of the burner tube therewith, whereby to control the flow of the singeing medium to the compartments of said burner tube.

In testimony whereof we affix our signatures, in the presence of two witnesses.

WALTER W. SIBSON.
THOMAS ALLSOP.

Witnesses:
RALPH M. ERWIN,
L. R. GARRETSON.

---

Copies of this patent may be obtained for five cents each, by addressing the "Commissioner of Patents, Washington, D. C."